Nov. 28, 1950          W. F. BERCK          2,531,903

TWO-CYLINDER ROTARY MOTOR

Filed Sept. 30, 1944          4 Sheets—Sheet 1

INVENTOR.
WILLIAM F. BERCK,
BY Oscar A. Mellin
ATTORNEY.

Nov. 28, 1950 W. F. BERCK 2,531,903
TWO-CYLINDER ROTARY MOTOR
Filed Sept. 30, 1944 4 Sheets-Sheet 2
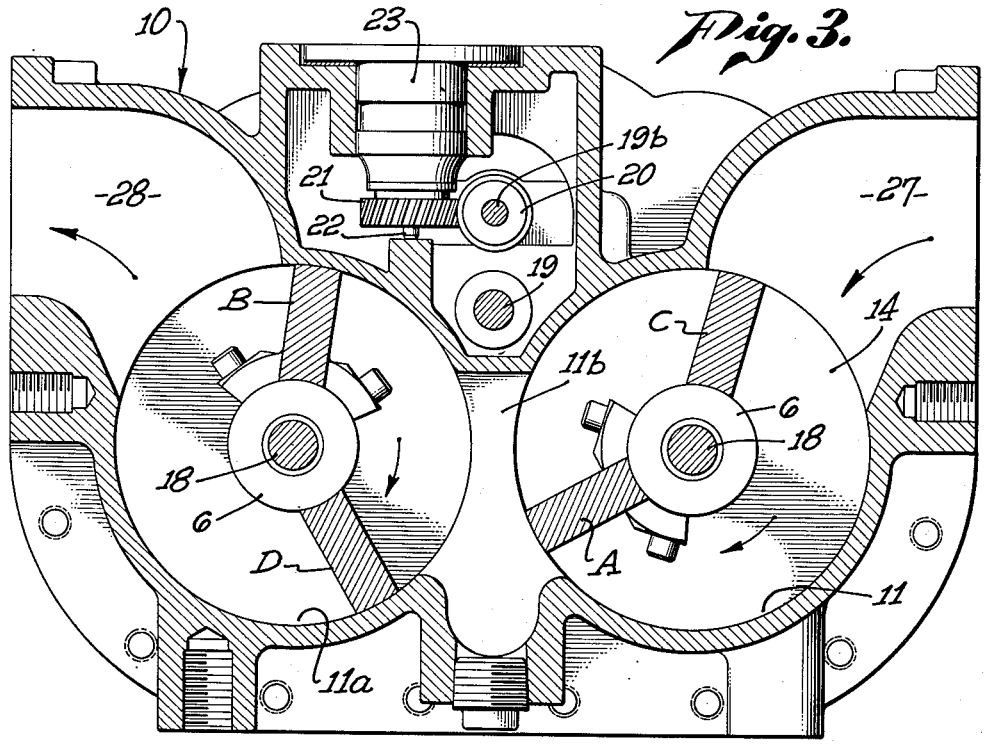
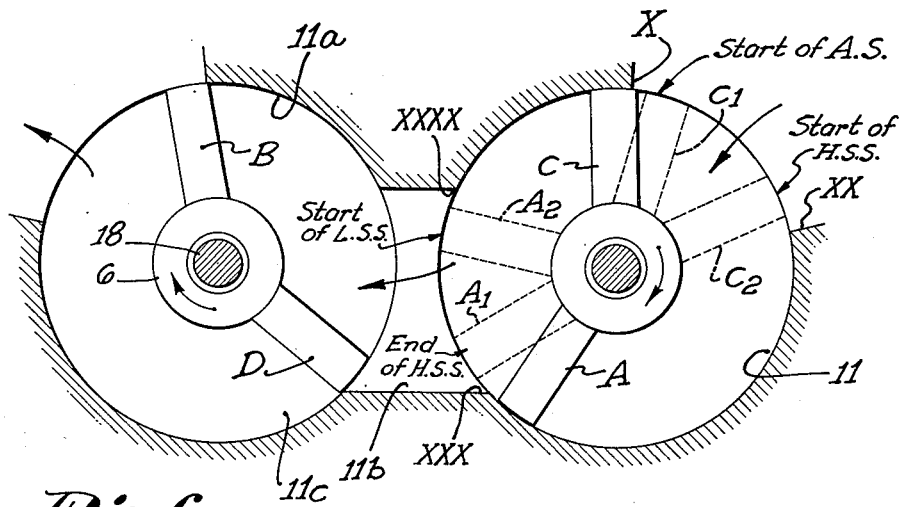
INVENTOR.
WILLIAM F. BERCK,
BY Oscar A. Mellin
attorney.

Nov. 28, 1950  W. F. BERCK  2,531,903
TWO-CYLINDER ROTARY MOTOR
Filed Sept. 30, 1944  4 Sheets-Sheet 3
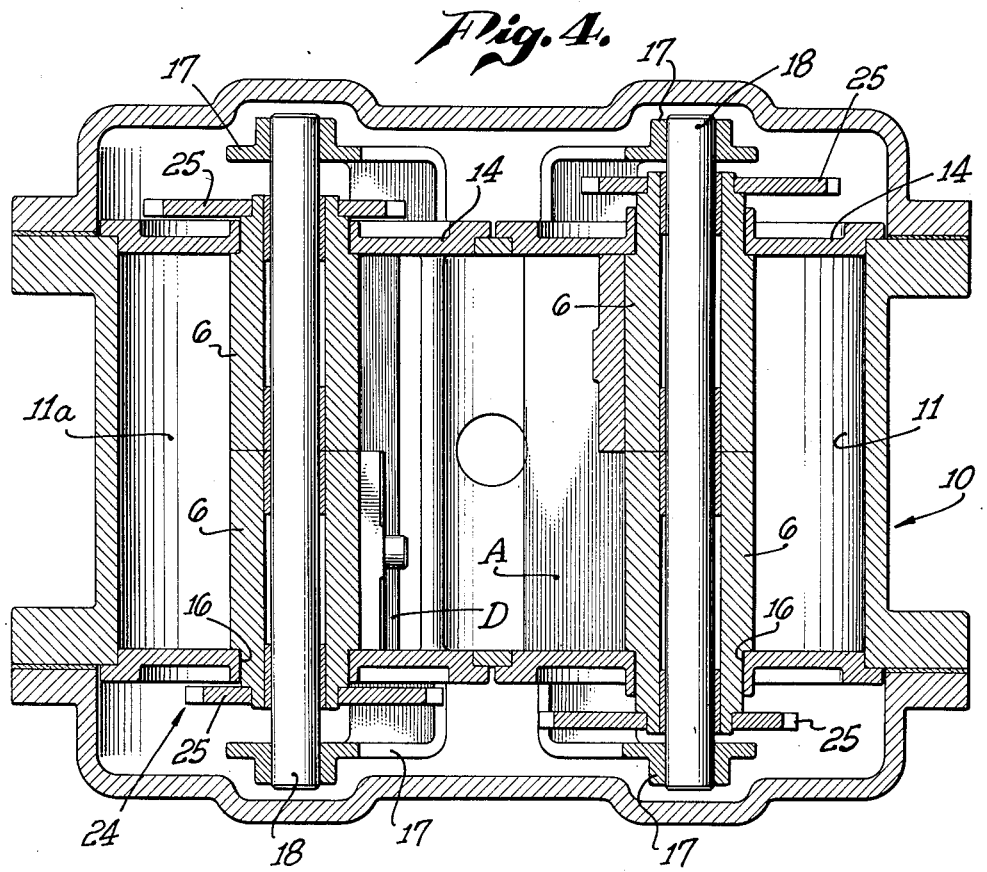
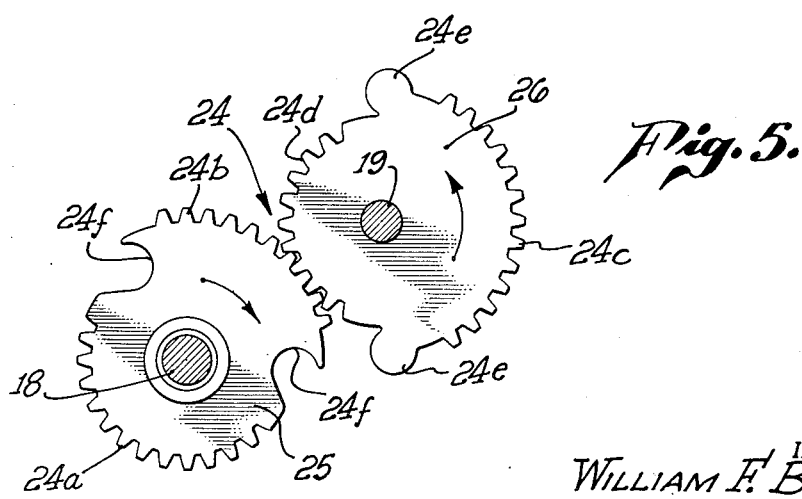
INVENTOR.
WILLIAM F. BERCK,
BY Oscar A. Mellin
ATTORNEY.

Nov. 28, 1950 W. F. BERCK 2,531,903
TWO-CYLINDER ROTARY MOTOR
Filed Sept. 30, 1944 4 Sheets-Sheet 4
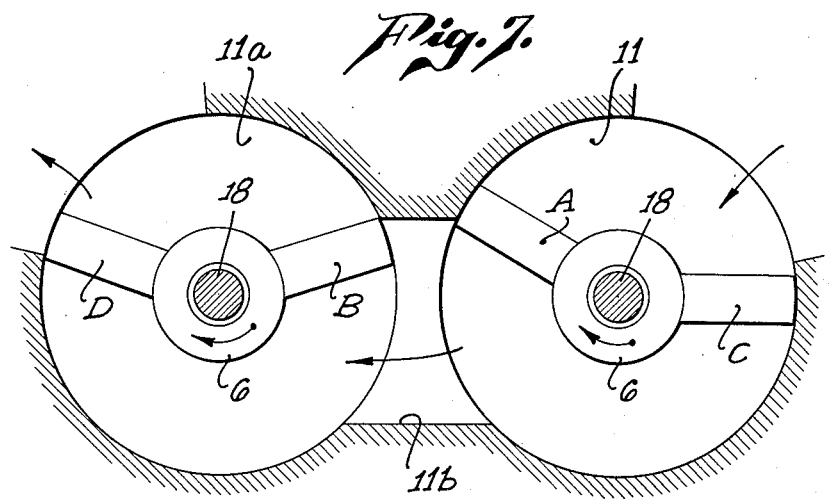
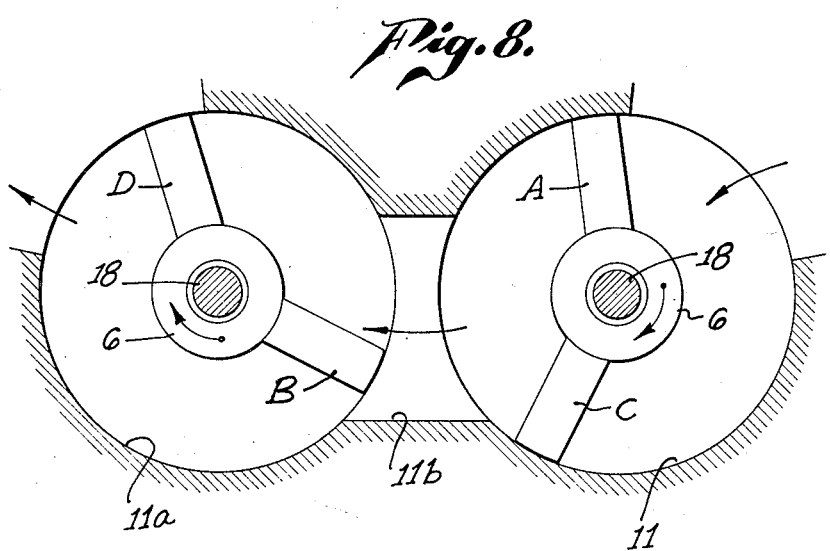
INVENTOR.
WILLIAM F. BERCK,
BY Oscar A. Mellin
ATTORNEY.

Patented Nov. 28, 1950

2,531,903

UNITED STATES PATENT OFFICE 2,531,903

TWO-CYLINDER ROTARY MOTOR

William F. Berck, Oakland, Calif., assignor to Ralph N. Brodie Company, Oakland, Calif., a corporation of California Application September 30, 1944, Serial No. 556,638

8 Claims. (Cl. 121—49)

This invention relates to fluid meters of the rotary displacement type.

It is the principal object of my present invention to provide a generally improved meter of the rotary displacement type of large capacity relative to its size, which will have balanced operating parts and in which friction is reduced to a minimum so that the operation thereof will consume a minimum of energy.

In practice, I provide a meter having two cylindrical metering chambers each traversed by two vanes which revolve in cycles of different stages about the axis of the chambers in relatively timed relation. The stages of the cycle of each vane are timed in relation to the inlet and outlet ports so that the fluid pressure from the inlet port operates the vanes and the same act to discharge a precise amount of fluid through the outlet port during each cycle with a minimum of energy loss.

One form which the invention may assume is exemplified in the following description and illustrated by way of example in the accompanying drawings, in which:

Fig. 3 is a transverse sectional view through the meter.

Fig. 4 is a plan sectional view through the meter.

Fig. 5 is a view showing a gear set for one vane.

Figs. 6, 7 and 8 are related diagrams showing the cycle of operation of the vanes.

Figure 1:
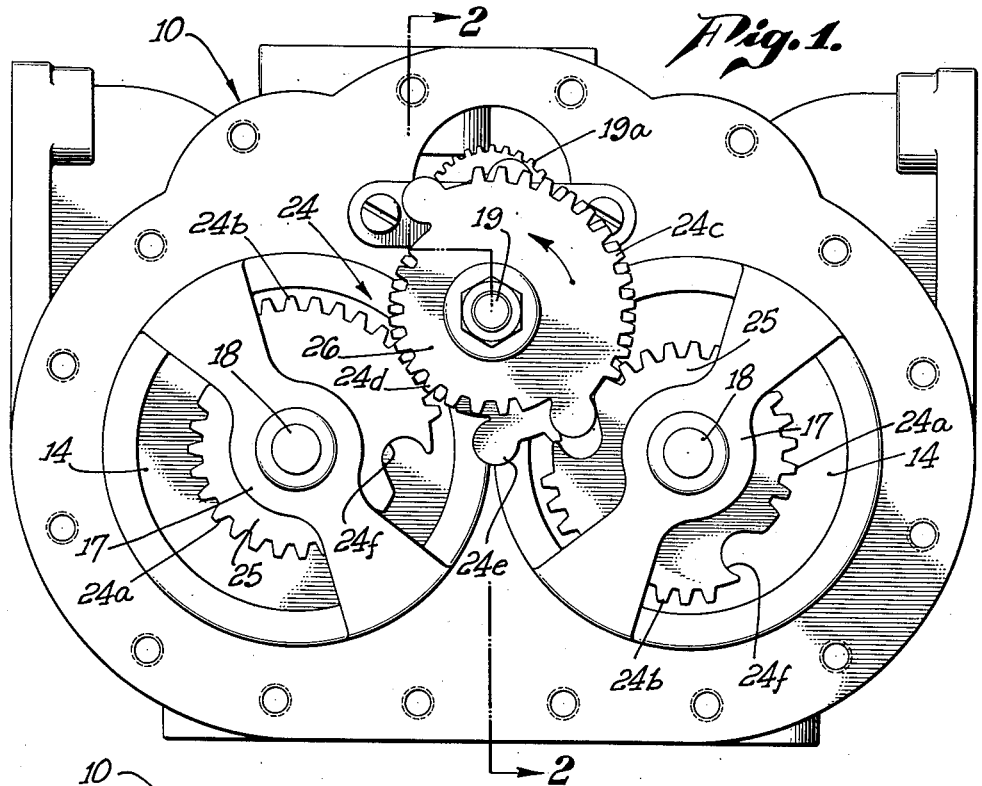
Fig. 1 is an end view (with the cover plate removed) of a meter embodying the preferred form of my invention.
Figure 2:
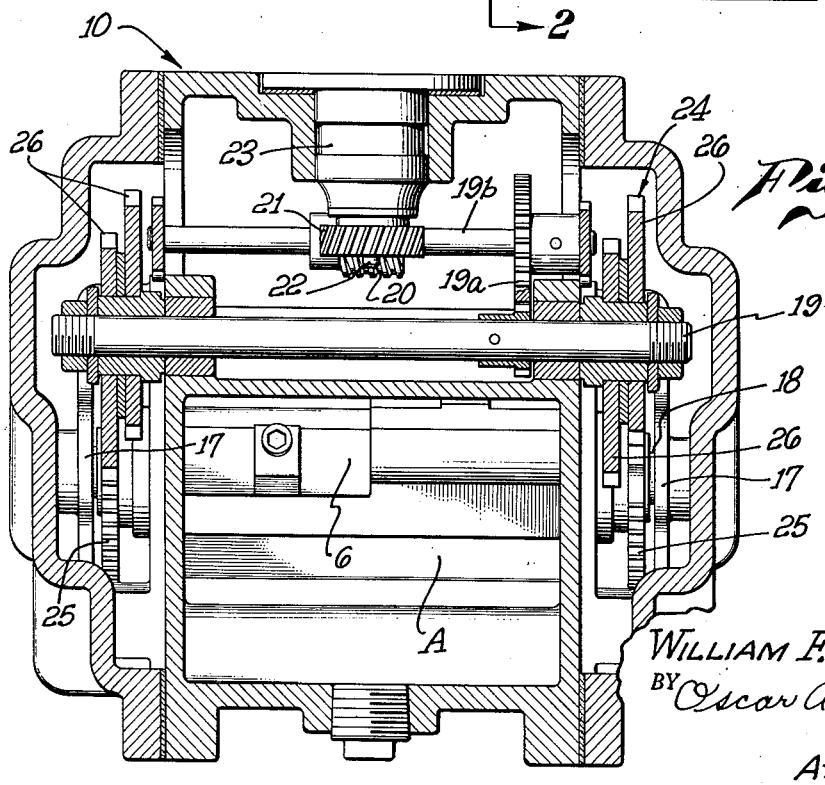
Fig. 2 is a longitudinal sectional view through the same.

Referring more particularly to the accompanying drawings, 10 indicates a meter casing having two straight cylindrical bores 11 and 11a arranged in side by side relationship and in parallelism. These bores or metering cylinders 11 and 11a extend longitudinally through the meter casing from end to end. The interior of the metering cylinders 11 and 11a are in communication with each other through an intercommunicating passageway 11b formed through their adjacent side walls. This passageway 11b extends the full length of the cylinders as illustrated.

Enclosing the ends of the cylinders 11 and 11a are fixed head members 14 which are fastened in appropriate fashion to the meter casing. Coaxially of each cylinder 11 and 11a the head members 14 thereof are formed with bores 16 which are in absolute alignment. Exteriorly of the head members 14 and spaced therefrom are outboard bearing members 17 in which are fixed, in a non-rotatable manner, the ends of a non-rotatable vane bearing shaft 18, which, of course, is disposed in absolute axial alignment with the cylinder in which it is mounted.

Rotatably mounted in the cylinders on the vane bearing shafts 18 thereof are vanes A and C in cylinder 11 and B and D in cylinder 11a, all of which are relatively rotatable to a controlled extent, as will be hereinafter described. It will be noticed that the two vanes of each cylinder each have a single bearing 6 one-half of the length of the shaft 18, which bearing is journalled on the shaft 18 and also in the adjacent head member through which it projects, all as illustrated.

The construction of these vane bearings 6 of the vanes A, B, C and D is obvious from Fig. 4. From this figure it will be noticed that one of the vane bearings of each cylinder projects beyond one head member, while the other vane bearing in said cylinder projects through the opposite head member. This is so that the vane bearing members may be associated with an interconnecting driving mechanism so that all four of the vanes will operate in precise synchronism throughout the stages of their cycle of operation.

This driving mechanism includes a jack shaft 19 journalled on the meter casing in parallelism with the vane bearing shafts 18, and, of course, exteriorly of the cylinders 11 and 11a. However, the jack shaft is located at equal distances from the centers of the two vane shafts 18. One purpose of the jack shaft 19 is to operate the meter counter to indicate the quantity of fluid measured by the meter and discharged therefrom. For this reason the jack shaft 19 is operatively connected by a gear train 19a to a worm shaft 19b, the latter of which is fitted with a worm 20 meshing with a worm wheel 21 on a meter counter drive shaft 22. A counter 23 is mounted in the top of the meter casing and is driven from the meter counter shaft 22. Inasmuch as the detailed construction of the counter 23 and its operative connection with the shaft 22 forms no part of my present invention, it is not further illustrated or described.

Mounted on the bearings 6 of the vanes and on the jack shaft 19 are four sets of gears 24, there being one vane gear 25 for each vane and one jack shaft gear 26 in mesh therewith fixed on the jack shaft 19. The vane gears 25 are, of course, each fixed on their respective vane bearing 6, and the jack shaft gears 26 are, of course, fixed on the jack shaft 19. These sets of gears 24 operate in timed relation during the operation of the meter, as will be hereinafter described, to drive the jack shaft 19 at a constant rotative speed at any given inlet fluid pressure.

The metering cylinders 11 and 11a are provided with an inlet port 27 and an outlet port 28. The inlet port 27 communicates with the cylinder 11, while the outlet port 28 communicates with the cylinder 11a. This is so that fluid pressure entering the inlet port 27 may enter into the cylinder 11 and thence through the cylinder 11a, engaging the vanes A, B, C and D as the latter move to their proper positions, causing the vanes to be driven in a clockwise direction (with reference to Fig. 3) to discharge the metered fluid through the outlet port 28.

It is seen from the drawings that the vanes each extend the full radial dimension of their respective cylinders 11 and 11a (which are of the same diameter) and contact the same at their outer peripheral edges. At their inner edges the vanes contact the periphery of the adjacent bearing 6 of the other vane in the cylinder so that each vane forms a complete moving partition in its metering cylinder. The ends of the vanes slidably engage the inner surfaces of the head members 14 at opposite ends of the cylinders. The fits between the ends and outer and inner peripheral edges of the vanes and the walls of the metering cylinders 11 and 11a are substantially fluid-tight under the differential pressures to which a meter of this type is subjected.

As illustrated in the drawings, the outer peripheral edge of each vane is of a width subtending an angle of approximately 15° at the axis, although I do not limit myself to this dimension. At the inlet side of the metering cylinder 11 the inlet port 27 commences at a point short of the vertical center line at the top of the cylinder 11 and extends short of the horizontal center line of the cylinder 11 at the same side thereof. The outlet port 28 is of precisely the same angularity and at the same relative position at the opposite side of cylinder 11a. The intercommunicating passageway 11b is of the same angularity as the inlet and outlet ports. Thus, the three ports 11b, 27 and 28 are of the same circumferential dimension.

As previously described, each vane has an associated set of gears 24 comprising a vane gear 25 fixed to its bearing 6 and a jack shaft gear 26 which is fixed to the jack shaft 19. The sets of gears 24 are identical in construction and formation, although the jack shaft gears for the vanes A, B, C and D are adjusted as to relative angularity so that, as they rotate, they are 90° out of phase with one another. For the purpose of this description it is believed sufficient to describe the formation and operation of but one set of gears. The relative angularity referred to is of course with respect to a line of reference or a fiducial line comprising any selected fixed line taken transversely through the structure and used as a standard of comparison.

Reference being had to the drawings, it will be seen that the vane gear 25 of each gear set 24 is formed with a concentric segmental gear face or segment 24a and a second concentric segmental gear face 24b of a greater radius than that of 24a. The jack shaft gear 26 of the set 24 is formed with a concentric segmental gear face 24c complemental to and meshing with the gear face 24a. The jack shaft gear is also formed with a concentric segmental gear face 24d complemental to so as to mesh with the teeth of the segmental gear face 24b. Intermediate the jack shaft gear segments 24c and 24d the jack shaft gear 26 is formed with intermediate exaggerated teeth 24e which are complemental to sockets 24f in the vane gear 25. The effect of these exaggerated teeth 24e and the complemental sockets 24f is to effect deceleration of speed between the high and low speed of the vane gear, or to effect acceleration of speed between the low and high speed of the vane gear, all as will be further explained herein.

Referring to the drawings and particularly to Fig. 6, this diagram shows the vane C just before it completes its low speed stage of its cycle. At this point the vane C will be operating at its lowest speed. During this time the segmental gear face 24d of the jack shaft gear 26 will be meshing with the segmental gear face 24b of the vane gear 25 of the vane C. When the vane C reaches the dotted line position shown in Fig. 6 and indicated at C1, the rear face of the vane will have traveled approximately 5° beyond the inlet port edge X, and at which point the end of the low speed stage of the vane C is terminated and one exaggerated tooth 24e has commenced to mesh with a complemental socket 24f, and at which time the vane C commences its acceleration stage of its cycle. This portion of the cycle is during that period of time when the exaggerated tooth 24e of the jack shaft gear 26 is in mesh with its complemental socket 24f of the vane gear. This causes an acceleration of the speed of the vane C until the exaggerated tooth 24e disengages the socket 24f, at which time the segmental gear face 24c of the jack shaft gear 26 will commence to mesh with the segmental face 24a of the vane gear 25. This occurs at the point where the leading edge of vane C is approximately 5° from the other or opposite edge XX of the inlet port, and the position of the vane at this time is indicated in dotted lines in Fig. 6 labeled C2. The vane C at this point commences its highest speed stage of operation, which endures for approximately 165° of rotation, or until the rear edge of the vane has passed the edge XXX of the intercommunicating passageway, or the position of a vane shown in dotted lines and indicated as A1 in Fig. 6. At this point the succeeding exaggerated tooth 24e of the jack shaft gear 26 will engage its complemental socket 24f in the vane gear and decelerate the speed of the vane gear, until the face 24d of the jack shaft gear commences to mesh with the face 24b of the vane gear. At this time the vane will be in the position shown in dotted lines in Fig. 6 and indicated at A2. In this position the leading face of the vane is approximately 5° short of the edge XXXX of the intercommunicating passageway or port. At this point the vane commences to rotate at its constant lowest speed until it again reaches the position where its rearmost face is 5° past the edge X of the inlet opening, or the position shown in dotted lines and indicated as C1 in Fig. 6.

It is thus seen that the effect of the exaggerated teeth 24e and the sockets 24f is to gradually accelerate the speed of the vane from its lowest speed stage to its highest or metering speed stage, and thereafter to decelerate the speed of the vane from the highest or metering speed to the lowest vane speed.

It is desired to point out, however, that the relative setting of the gear sets 24 is such that when one vane is going through its accelerating stage, the opposite vane is going through its deceleration stage, so that one offsets the other and minimizes the loss of energy.

The individual cycle of all the vanes is precisely alike except for their timing. Consequently, with the vanes shown in the full line position in Fig. 6, vane A is moving at its highest speed stage. Vane B is moving at its lowest speed stage. Vane C is moving at its lowest speed stage and vane D is moving at its highest speed stage. In this condition in the meter there is no direct connection between the interior of the cylinder 11 and the outlet opening 28. Likewise, in this condition the vane A is reducing the space between it and vane C and discharging the fluid into the cylinder 11a between the vanes B and D. Vane D, advancing faster than vane B, is enlarging the space between it and vane B at the same rate as the space between A and C is being decreased, so that no tendency to compress fluid or draw vacuum is present because the chamber between vanes D and B receives the fluid displaced from between vanes A and C.

During the time that the vane A was on its metering or highest speed stroke, which commenced just prior to its passing the edge XX of its inlet opening, the fluid pressure on A is the medium by which the meter is operated. However, as shown in Fig. 3, after A has commenced its deceleration cycle and C is in its acceleration cycle, the vane D will be on its metering cycle and there will be direct fluid pressure from the inlet 27 through the cylinder 11 on the vane D, providing the medium for operating the meter. Therefore, the vanes of the cylinders 11 and 11a are alternately on the metering stroke and when so on the metering stroke, the inlet pressure is again the same to effect the meter operation.

Thus, it is seen that first the vane A will be subjected (when it is in the position beyond the edge XX of the inlet opening) to receive the fluid pressure while it is in its metering or highest speed stage. While the vanes A and C thereafter are going through their deceleration and acceleration stages, respectively, the fluid pressure passes directly through the cylinder 11 and is accelerated against the vane D, which at that time is going through its metering stage. Thereafter, vane C reaches its highest speed stage and is subjected to the fluid pressure for meter operation, and after it commences its deceleration stage, the vane B will be in position to commence its highest speed or metering stage.

Thus, each vane in turn effects metering or discharging of the fluid from the meter, there being an overlap, of course, between the metering stages to prevent a direct flow from the inlet to the outlet. During this overlap, however, the communicating chambers between the vanes in both cylinders expand and contract at the same rate so that no compression or tendency to draw vacuum can occur.

The rotative speed of the jack shaft 19 will remain constant and the speed of the jack shaft gears will remain constant at all times because, as previously described, the jack shaft gears of the sets are relatively timed 90° apart, and therefore, an overlapping drive of said shaft 19 occurs to maintain its speed constant, although the vane speeds vary at each stage of their complete cycle. In other words, the jack shaft 19 revolves constantly at the same speed in fixed relation to the highest vane speed.

It is also desired to point out that at no time are two vanes in either cylinder disposed in the "land" area between the ports of that cylinder at the same time. This prevents, of course, any tendency to create compression or a vacuum and interfere with the meter operation.

I desire to point out that by the construction shown and the ratio between the jack shaft and the vane gears as illustrated, the differential between the highest and lowest vane speed is approximately two to one. I am aware, however, that other speed ratios can be employed and I do not limit myself to such ratio. I do wish to emphasize, however, that when one vane is going through the deceleration cycle, the vane approximately diametrically opposite it is going through its acceleration cycle so that the effect of one is offset by the other to minimize the loss of energy.

In operation of the meter, it is constructed and assembled as described with fluid under pressure present at the port 27. The pressure of this inlet fluid will drive the vanes in succession, as previously described, to drive the jack shaft through the gear sets 24 at a rate in direct proportion to the highest speed rate of vane travel. Thus, the speed of the jack shaft will be constant for any given inlet pressure.

Inasmuch as the jack shaft is driven at a speed in fixed relation to the highest speed stage of the vanes, the number of its rotations will be counted, due to its connection with the counter, as previously described, and interpreted by the counter into gallons of fluid passing through the outlet port. In other words, knowing the amount of fluid discharged during each cycle from the meter, this amount is translated by rotation of the jack shaft into gallons on the counter. The amount of fluid discharged during each cycle will be the volume of fluid displaced by each vane during its metering or highest speed stage minus the volume of fluid trapped or carried over between the vanes. It is obvious, of course, that the inlet and outlet ports and the metering cylinders are at all times filled with liquid during operation.

From the foregoing it is obvious that I have provided a highly efficient meter of simple construction in which friction is reduced to a minimum and in which the highest degree of mechanical balance is obtained, so that the energy loss is minimized. Obviously, the meter here disclosed will be accurate in operation and effect a minimum of pressure drop from the inlet to the outlet port thereof.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. A rotary meter comprising a casing having a pair of intercommunicating parallel annular metering chambers, said casing having an inlet port in communication with one chamber and an outlet port communicating with the other chamber, a pair of vanes mounted in each chamber, said vanes being mounted to traverse said chambers continuously in one direction, interconnecting gear means between the four vanes relatively timing the same at ninety degrees apart in relation to a fiducial line and causing each vane to operate through a complete cycle composed of a plurality of stages of relatively different speeds, said stages including a metering stage of a constant highest speed, a speed deceleration stage commencing at the end of the metering stage, a constant lowest speed stage commencing at the end of the deceleration stage, and an acceleration stage commencing at the end of the constant lowest speed stage and terminating at the commencement of the highest speed stage.

2. A rotary meter comprising a casing having a pair of intercommunicating parallel annular metering chambers, said casing having an inlet port in communication with one chamber and an outlet port communicating with the other chamber, a pair of vanes mounted in each chamber, said vanes being mounted to traverse said chambers continuously in one direction, interconnecting gear means between the four vanes relatively timing the same at ninety degrees apart in relation to a fiducial line and causing each vane to operate through a complete cycle composed of a plurality of stages of relatively different speeds, said stages including a metering stage of a constant highest speed, a speed deceleration stage commencing at the end of the metering stage, a constant lowest speed stage commencing at the end of the deceleration stage, and an acceleration stage commencing at the end of the constant lowest speed stage and terminating at the commencement of the highest speed stage, said interconnecting gear means so interconnecting said vanes that the deceleration stage of one vane coincides in time with the acceleration stage of another vane.

3. A rotary meter comprising a casing having a pair of annular metering chambers arranged in side by side relationship, said casing having an intercommunicating port formed between said chambers, said casing being formed with an inlet port communicating with one chamber and an outlet port communicating with the opposite chamber, a pair of vanes mounted in each chamber to traverse the same continuously in one direction, interconnecting gears between the vanes causing each vane to operate through a complete cycle composed of a plurality of stages of relatively different speeds, said stages including a metering stage of a constant highest speed, a speed deceleration stage commencing at the end of the metering stage, a constant lowest speed stage commencing at the end of the deceleration stage, and an acceleration stage commencing at the end of the lowest speed stage and accelerating the speed of the vane until it reaches the speed of the constant highest speed at the point of commencement of the metering stage, said interconnecting gears operating said vanes so that the same will be relatively timed at ninety degrees apart in relation to a fiducial line and so that the deceleration stage of one vane coincides in time with the acceleration stage of another vane.

4. A rotary meter comprising a casing having a pair of annular metering chambers arranged in side by side relationship, said casing having an intercommunicating port formed between said chambers, said casing being formed with an inlet port communicating with one chamber and an outlet port communicating with the opposite chamber, a pair of vanes mounted in each chamber to traverse the same continuously in one direction, interconnecting gear means between the vanes causing each vane to operate through a complete cycle composed of a plurality of stages of relatively different speeds, said stages including a metering stage of a constant highest speed, a speed deceleration stage commencing at the end of the metering stage, a constant lowest speed stage commencing at the end of the deceleration stage, and an acceleration stage commencing at the end of the lowest speed stage and accelerating the speed of the vane until it reaches the speed of the constant highest speed at the point of commencement of the metering stage, said interconnecting means relatively timing said vanes at ninety degrees apart in relation to a fiducial line, said interconnecting means so relatively timing said stages that displacement is effected first by the vanes of one chamber and then by the vanes of the other chamber without at any time permitting direct communication between the inlet port and the outlet port.

5. A rotary meter comprising a casing having a pair of parallel annular chambers formed therein, said casing being formed with an inlet port communicating with one chamber and with an outlet port communicating with the other chamber, said casing having an intercommunicating port between said chambers and communicating with both thereof, a pair of relatively movable vanes in each chamber adapted to continuously traverse the same in the same direction, interconnecting gear means between all four vanes whereby they will operate in synchronism, said interconnecting means so causing operation of the vanes that liquid is displaced alternately by the vanes of the two chambers without at any time permitting direct communication between the inlet and outlet ports.

6. A rotary meter comprising a casing having a pair of parallel annular metering cylinders formed therein, a pair of relatively movable vanes in each cylinder adapted to continuously traverse the same in the same direction of rotation, said casing having an inlet port in communication with one cylinder and an outlet port in communication with the other cylinder and an intercommunicating port in communication with both cylinders, interconnecting gear means between the four vanes whereby the cylinders will alternately receive fluid from the inlet port and displace the same through the outlet port without at any time there being established direct communication between the inlet and outlet ports, said interconnecting means so timing the operation of the vanes that when the intercommunicating port is out of communication with both the inlet and outlet ports the rate of expansion of the space between the vanes of one cylinder which is in communication with the intercommunicating port is the same as the rate of contraction of the space between the vanes of the other cylinder which is in communication with the intercommunicating port.

7. A rotary meter comprising a casing having a pair of parallel annular metering cylinders formed therein, a pair of relatively movable vanes in each cylinder adapted to continuously traverse the same in the same direction of rotation, said casing having an inlet port in communication with one cylinder and an outlet port in communication with the other cylinder and an intercommunicating port in communication with both cylinders, interconnecting gear means between the four vanes whereby the cylinders will alternately receive fluid from the inlet port and displace the same through the outlet port without at any time there being established direct communication between the inlet and outlet ports, said interconnecting gear means so timing the operation of the vanes that when the intercommunicating port is out of communication with both the inlet and outlet ports the rate of expansion of the space between the vanes of one cylinder which is in communication with the intercommunicating port is the same as the rate of contraction of the space between the vanes of the other cylinder which is in communication with the intercommunicating port, said interconnecting means between the vanes relatively timing the same at ninety degrees apart in relation to a fiducial line and causing each vane to operate through a continuous cycle of a metering stage, a speed deceleration stage, a low speed stage and an accelerating speed stage.

8. A rotary meter comprising a casing having a pair of parallel annular metering cylinders formed therein, a pair of relatively movable vanes in each cylinder adapted to continuously traverse the same in the same direction of rotation, said casing having an inlet port in communication with one cylinder and an outlet port in communication with the other cylinder and an intercommunicating port in communication with both cylinders, interconnecting gear means between the four vanes whereby the cylinders will alternately receive fluid from the inlet port and displace the same through the outlet port without at any time there being established direct communication between the inlet and outlet ports, said interconnecting means so timing the operation of the vanes that when the intercommunicating port is out of communication with both the inlet and outlet ports the rate of expansion of the space between the vanes of one cylinder which is in communication with the intercommunicating port is the same as the rate of contraction of the space between the vanes of the other cylinder which is in communication with the intercommunicating port, said interconnecting means between the vanes relatively timing the same at ninety degrees apart in relation to a fiducial line and causing each vane to operate through a continuous cycle of a metering stage, a speed deceleration stage, a low speed stage and an accelerating speed stage, the relative timing of said stages being such that the deceleration stage of one vane coincides in time with the acceleration stage of another vane.

WILLIAM F. BERCK.

REFERENCES CITED

The following references are of record in the file of this patent:

UNITED STATES PATENTS

| Number | Name | Date |
|---|---|---|
| 1,952,882 | Morgan | Mar. 27, 1934 |
| 2,017,825 | Woodford | Oct. 15, 1935 |
| 2,196,669 | Renfrew | Apr. 9, 1940 |
| 2,207,182 | Smith | July 9, 1940 |
| 2,305,797 | Shimizu | Dec. 22, 1942 |